United States Patent
Han et al.

(10) Patent No.: US 9,597,592 B2
(45) Date of Patent: Mar. 21, 2017

(54) METHOD AND APPARATUS FOR PROCESSING VIRTUAL WORLD

(75) Inventors: Jae Joon Han, Gyeonggi-do (KR);
Seung Ju Han, Gyeonggi-do (KR);
Won Chul Bang, Gyeonggi-do (KR);
Do Kyoon Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 335 days.

(21) Appl. No.: 13/641,026

(22) PCT Filed: Apr. 6, 2011

(86) PCT No.: PCT/KR2011/002408
§ 371 (c)(1),
(2), (4) Date: Dec. 26, 2012

(87) PCT Pub. No.: WO2011/129543
PCT Pub. Date: Oct. 20, 2011

(65) Prior Publication Data
US 2013/0093665 A1    Apr. 18, 2013

(30) Foreign Application Priority Data

Apr. 13, 2010 (KR) .................. 10-2010-0033947
Mar. 18, 2011 (KR) .................. 10-2011-0024448

(51) Int. Cl.
*A63F 13/428*    (2014.01)
*G06F 3/01*      (2006.01)
(Continued)

(52) U.S. Cl.
CPC ........... *A63F 13/428* (2014.09); *A63F 13/06* (2013.01); *A63F 13/10* (2013.01); *A63F 13/212* (2014.09);
(Continued)

(58) Field of Classification Search
CPC ....................................................... G06F 3/017
(Continued)

(56) References Cited

U.S. PATENT DOCUMENTS 5,963,891 A  * 10/1999  Walker .................. G06F 3/011
                                                      345/959
6,050,962 A    4/2000   Kramer et al.
(Continued)

FOREIGN PATENT DOCUMENTS

CN    2725994        9/2005
JP    2000-132305 A  5/2000
(Continued)

OTHER PUBLICATIONS

Lim, Kwang Yong, et al. "A Wearable, Self-Calibrating, Wireless Sensor Network for Body Motion Processing." IEEE, 2008 *IEEE International Conference on Robotics and Automation*, May 19-23, 2008, pp. 1017-1022.
(Continued)

*Primary Examiner* — Kent Chang
*Assistant Examiner* — Chayce Bibbee
(74) *Attorney, Agent, or Firm* — NSIP Law

(57) ABSTRACT

A virtual world processing apparatus and method. An angle value is obtained by measuring an angle of a body part of a user of a real world using sensor capability, which is information on capability of a bending sensor, and is transmitted to a virtual world, thereby achieving interaction between the real world and the virtual world. In addition, based on the sensor capability and the angle value denoting the angle of the body part, control information is generated to control a part of an avatar of the virtual world, corresponding to the body part, and then transmitted to the virtual world. Accordingly, interaction between the real world and the virtual world is achieved.

19 Claims, 6 Drawing Sheets

(51) Int. Cl.
  *A63F 13/212* (2014.01)
  *A63F 13/40* (2014.01)
  *A63F 13/20* (2014.01)

(52) U.S. Cl.
  CPC ...... *G06F 3/011* (2013.01); *A63F 2300/1012* (2013.01); *A63F 2300/1025* (2013.01); *A63F 2300/6045* (2013.01); *A63F 2300/65* (2013.01)

(58) Field of Classification Search
  USPC ........................................................ 345/156
  See application file for complete search history.

(56) References Cited

U.S. PATENT DOCUMENTS

| | | | |
|---|---|---|---|
| 7,602,301 B1* | 10/2009 | Stirling | A61B 5/1127 340/573.1 |
| 2003/0062675 A1 | 4/2003 | Noro et al. | |
| 2003/0181832 A1* | 9/2003 | Carnahan | A61B 5/4528 600/595 |
| 2008/0125224 A1 | 5/2008 | Pollatsek | |
| 2009/0005140 A1 | 1/2009 | Rose et al. | |
| 2009/0221368 A1 | 9/2009 | Yen et al. | |

FOREIGN PATENT DOCUMENTS

| | | |
|---|---|---|
| JP | 2003-103045 | 4/2003 |
| JP | 2004-213350 A | 7/2004 |
| JP | 2010-014712 A | 1/2010 |
| JP | 2010-017387 A | 1/2010 |
| WO | WO 98/47426 | 10/1998 |
| WO | WO 2009/096408 A1 | 6/2009 |

OTHER PUBLICATIONS

Morris, Stacy J., et al. "Shoe-Integrated Sensor System for Wireless Gait Analysis and Real-Time Feedback." IEEE, *Proceedings of the Second Joint EMBS/BMES Conference*, Oct. 23-26, 2002, pp. 2468-2469.

Jovanov, Emil, et al. "A wireless body area network of intelligent motion sensors for computer assisted physical rehabilitation." In *Journal of NeuroEngineering and Rehabilitation* 2:6, No. 1, Mar. 1, 2005, pp. 1-10.

Nguyen, Kim Doang, et al. "A Body Sensor Network for Tracking and Monitoring of Functional Arm Motion." IEEE, 2009 *IEEE/RSJ International Conference on Intelligent Robots and Systems*. Oct. 11-15, 2009, pp. 3862-3867.

European Search Report Issued Jan. 29, 2014 in corresponding European Application No. 11769009.9 filed in the European Patent Office.

Chinese Office Action issued Jan. 27, 2014 in corresponding Chinese Application No. 201180018649.0.

International Search Report of PCT/KR2011/002408 mailed Dec. 15, 2011.

Japanese Office Action issued Aug. 9, 2016, in counterpart Japanese Application No. 2015-167901 (4 pages in English, 5 pages in Japanese).

Maruyama Daisuke et al., "Sensor Data Management Middleware Utilizing Sensor Metadata" Image Information Media Technical Report, Apr. 23, 2004, vol. 28, No. 24, pp. 11-16.

Japanese Office Action issued on Mar. 17, 2015 in counterpart Japanese Application No. 2013-504805 (7 pages in Japanese with English translation).

* cited by examiner

METHOD AND APPARATUS FOR PROCESSING VIRTUAL WORLD

CROSS-REFERENCE TO RELATED APPLICATIONS

This application is a U.S. National Phase application of PCT/KR2011/002408 filed Apr. 6, 2011 and claims the priority benefit of Korean Application No. 10-2011-0024448 filed Mar. 18, 2011 and Korean Application No. 10-2010-0033947 filed Apr. 13, 2010 in the Korean Intellectual Property Office, the contents of each of which are incorporated herein by reference.

BACKGROUND

1. Field

Example embodiments of the following description relate to a virtual world processing apparatus and method, and more particularly, to an apparatus and method for applying detection information measured by a bending sensor to the virtual world.

2. Description of the Related Art

In the current market, the consumers' interest in experience-type games has been increasing. MICROSOFT CORPORATION introduced PROJECT NATAL at the "E3 2009" Press Conference. PROJECT NATAL may provide a user body motion capturing function, a face recognition function, and a voice recognition function by combining MICROSOFT's XBOX 360 game console with a separate sensor device that includes a depth/color camera and a microphone array, thereby enabling a user to interact with a virtual world without a dedicated controller. In addition, SONY CORPORATION introduced WAND which is an experience-type game motion controller. The WAND enables interaction with a virtual world through input of a motion trajectory of a controller by applying, to the SONY PLAYSTATION 3 game console, a location/direction sensing technology obtained by combining a color camera, a marker, and an ultrasonic sensor.

The interaction between a real world and a virtual world operates in one of two directions. In one direction, data information obtained by a sensor in the real world may be reflected to the virtual world. In the other direction, data information obtained from the virtual world may be reflected to the real world using an actuator.

Accordingly, there is a desire to implement an improved apparatus and method for applying information sensed from a real world by a bending sensor to a virtual world.

SUMMARY

According to an aspect of the present disclosure, there is provided a virtual world processing apparatus including a receiving unit to receive an angle value of at least one sensed location and sensor capability of a bending sensor from the bending sensor; a processing unit to generate control information for controlling an object of a virtual world corresponding to the at least one sensed location, based on the angle value and the sensor capability; and a transmission unit to transmit the control information to the virtual world.

According to an aspect of the present disclosure, there is provided a virtual world processing method including receiving an angle value of at least one sensed location and sensor capability of a bending sensor from the bending sensor; generating control information for controlling an object of a virtual world corresponding to the at least one sensed location, based on the angle value and the sensor capability; and transmitting the control information to the virtual world.

According to an aspect of the present disclosure, there is provided a method of interacting between a real world and a virtual world, the method including: sensing angle values, by plural bending sensors, respectively disposed at plural sensed locations of a user; and generating control information for controlling an avatar of a virtual world corresponding to the plural sensed locations, based on the sensed angle values and sensor capability.

DETAILED DESCRIPTION

Figure 1:
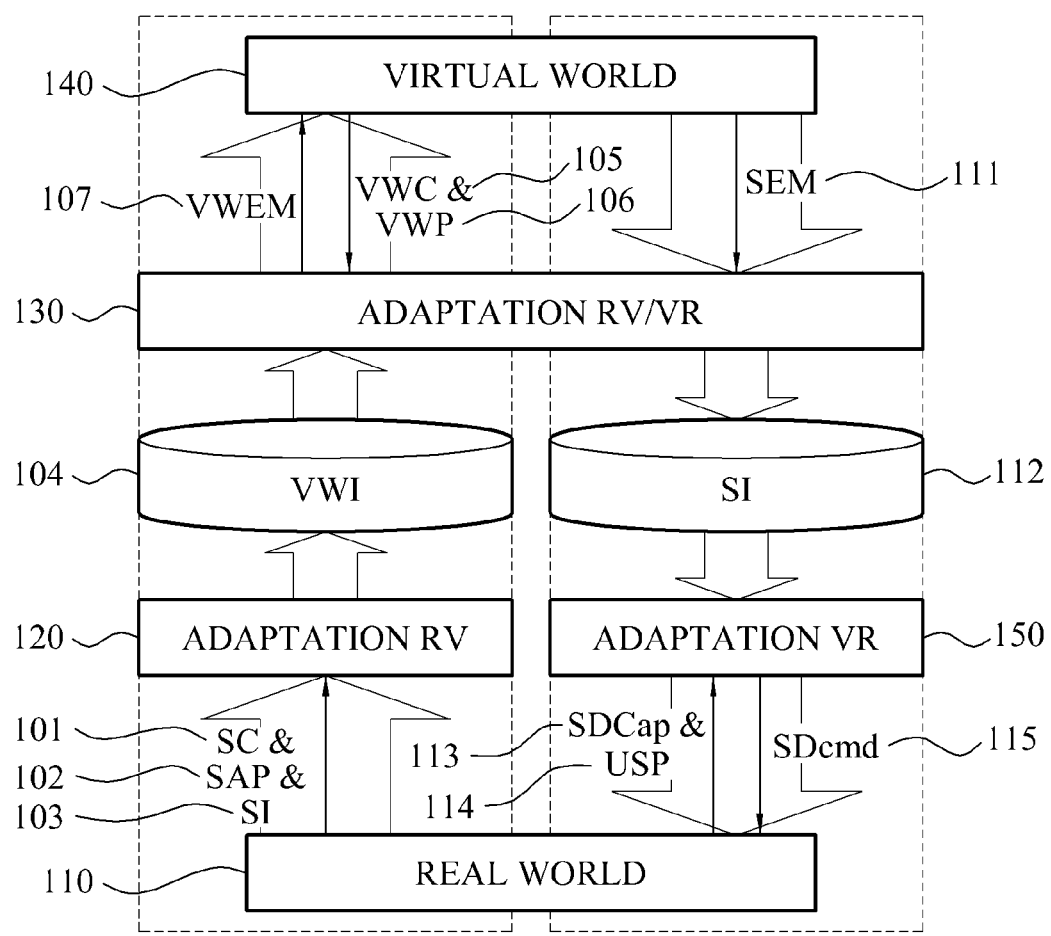
FIG. 1 is a diagram illustrating a virtual world processing system that controls data exchange between a real world and a virtual world, according to example embodiments.

Reference will now be made in detail to example embodiments, examples of which are illustrated in the accompanying drawings, wherein like reference numerals refer to the like elements throughout. Example embodiments are described below to explain the present disclosure by referring to the figures.

FIG. 1 illustrates a virtual world processing system that controls data exchange between a real world and a virtual world, according to example embodiments.

Referring to FIG. 1, the virtual world processing system includes a real world 110, a virtual world processing apparatus, and a virtual world 140.

The real world 110 may denote a sensor that detects information on the real world 110 or a sensory device that implements information on the virtual world 140 in the real world 110.

The virtual world 140 may denote the virtual world 140 itself implemented by a program or a sensory media playing apparatus that plays contents including sensory effect information implementable in the real world 110.

A sensor according to example embodiments may sense information on a movement, state, intention, shape, and the like of a user in the real world 110, and transmit the information to the virtual world processing apparatus.

Depending on embodiments, the sensor may transmit sensor capability 101, sensor adaptation preference 102, and sensed information 103 to the virtual world processing apparatus.

The sensor capability 101 may denote information on the capability of the sensor. The sensor adaptation preference 102 may denote information on preference of the user with respect to the sensor capability. The sensed information 103 may denote information sensed in relation to the real world 110 by the sensor.

The virtual world processing apparatus may include an adaptation real world to virtual world (RV) 120, virtual world information (VWI) 104, and an adaptation real world to virtual world/virtual world to real world (RV/VR) 130.

The adaptation RV 120 may convert the sensed information 103 sensed by the sensor in relation to the real world 110 to information applicable to the virtual world 140, based on the sensor capability 101 and the sensor adaptation preference 102. Depending on embodiments, the adaptation RV 120 may be implemented by an RV engine.

The adaptation RV 120 according to example embodiments may convert the VWI 104 using the converted sensed information 103.

The VWI 104 denotes information on a virtual object of the virtual world 140.

The adaptation RV/VR 130 may generate virtual world effect metadata (VWEM) 107, which denotes metadata related to effects applied to the virtual world 140, by encoding the converted VWI 104. Depending on embodiments, the adaptation RV/VR 130 may generate the VWEM 107 based on virtual world capabilities (VWC) 105 and virtual world preferences (VWP) 106.

The VWC 105 denotes information on characteristics of the virtual world 140. The VWP 106 denotes information on preferences of the user with respect to the characteristics of the virtual world 140.

The adaptation RV/VR 130 may transmit the VWEM 107 to the virtual world 140. Here, the VWEM 107 may be applied to the virtual world 140 so that effects corresponding to the sensed information 103 may be implemented in the virtual world 140.

According to an aspect of the present disclosure, an effect event generated in the virtual world 140 may be driven by a sensory device, that is, an actuator in the real world 110.

The virtual world 140 may encode sensory effect information, which denotes information on the effect event generated in the virtual world 140, thereby generating sensory effect metadata (SEM) 111. Depending on embodiments, the virtual world 140 may include the sensory media playing apparatus that plays contents including the sensory effect information.

The adaptation RV/VR 130 may generate sensory information 112 based on the SEM 111. The sensory information 112 denotes information on an effect event implemented by the sensory device of the real world 110.

The adaptation VR 150 may generate information on a sensory device command (SDcmd) 115 for controlling operation of the sensory device of the real world 110. Depending on embodiments, the adaptation VR 150 may generate the information on the SDcmd 115 based on information on sensory device capabilities (SDCap) 113 and information on user sensory preference (USP) 114.

The SDCap 113 denotes information on capability of the sensory device. The USP 114 denotes information on preference of the user with respect to an effect implemented by the sensory device.

Figure 2:
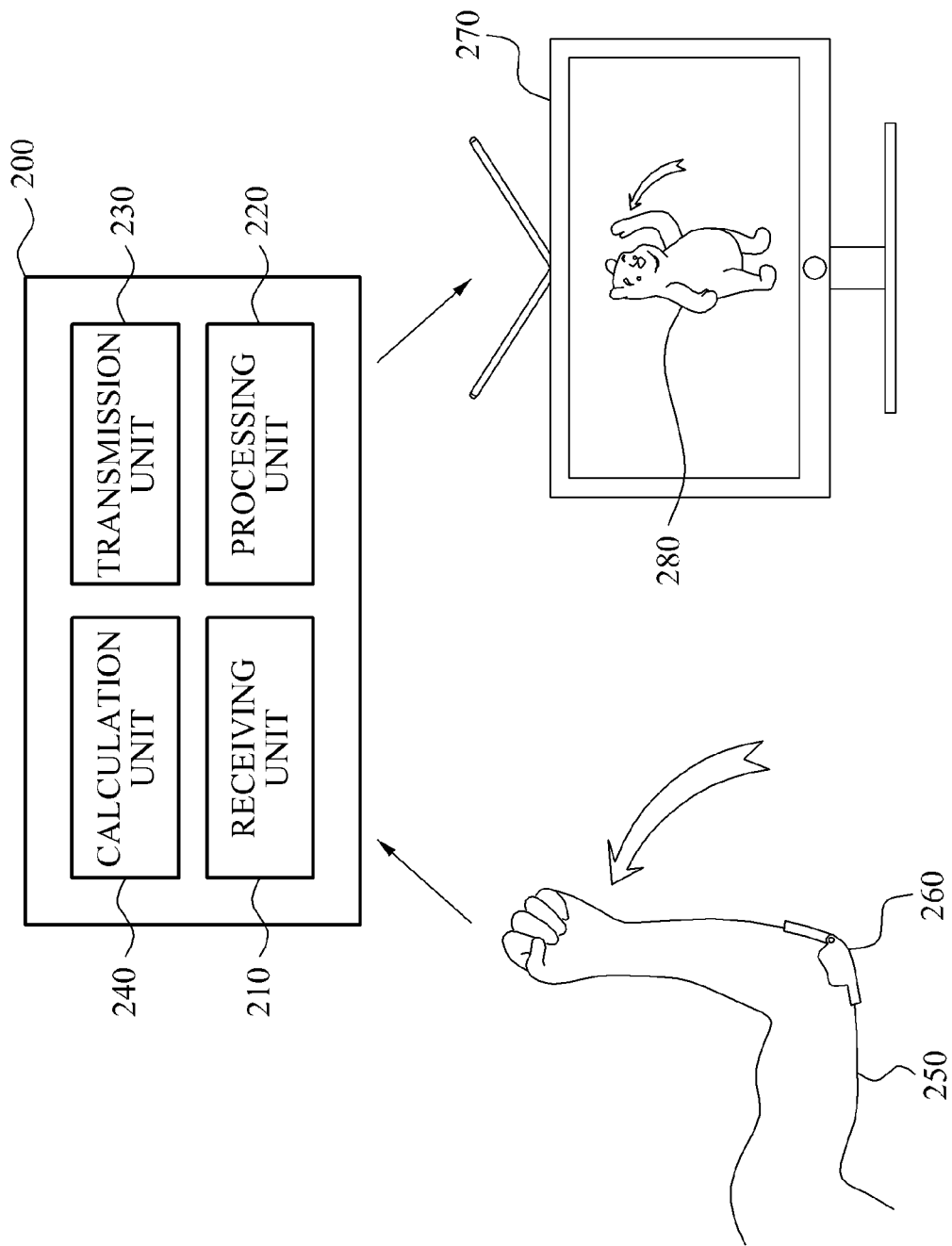
FIG. 2 is a diagram illustrating a structure of a virtual world processing apparatus, according to example embodiments.

FIG. 2 illustrates a structure of a virtual world processing apparatus 200 according to example embodiments.

Referring to FIG. 2, the virtual world processing apparatus 200 includes a receiving unit 210, a processing unit 220, and a transmission unit 230. In another example embodiment, which will be discussed later, the virtual world processing apparatus 200 additionally includes a calculation unit 240.

The receiving unit 210 may receive, from a bending sensor 260, an angle value of a sensed location measured by the bending sensor 260 and sensor capability related to capability of the bending sensor 260.

The bending sensor 260 measures sensed information related to a bending degree of an object of a real world. The sensed information denotes a measured value of the bending degree, that is, an angle of the sensed location measured by the bending sensor 260.

Depending on embodiments, the bending sensor 260 may be attached or connected to the sensed location to measure the bending degree, that is, the angle of the sensed location. For example, when a user 250 attaches the bending sensor 260 to an elbow, the bending sensor 260 may sense a bending degree of the elbow of the user, that is, an angle of the elbow. Here, the bending sensor 260 may transmit an angle value of the elbow and sensor capability of the bending sensor 260 to the virtual world processing apparatus 200, thereby controlling an elbow movement of an avatar, for example. As shown in FIG. 2, as an example, when the user 250 rotates an elbow, such that an arm rotates upward, the virtual world processing apparatus 200 may process the angle value and sensor capability, transmitted by the bending sensor 260, thereby controlling an avatar 280.

The bending sensor 260 may be connected to other joints of the user 250, including elbows, finger joints, a neck, shoulders, and the like, to measure bending degrees of the joints.

The sensor capability denotes the capability of the bending sensor 260.

According to example embodiments, the sensor capability of the bending sensor 260 may include maxValue, minValue, Num of Locations, Distance between Location, numOfAxes, and numOfSensors, however, the present disclosure is not limited thereto.

The maxValue may denote a maximum angle value measurable by the bending sensor 260. The minValue may denote a minimum angle value measurable by the bending sensor 260. The bending sensor 260 may measure an angle of the sensed location within a range from greater than the minValue to smaller than the maxValue.

The Num of Locations may denote the number of the sensed locations sensed by the bending sensor 260. According to an aspect of the present disclosure, the bending sensor 260 may singly and simultaneously sense bending degrees of a plurality of sensed locations. Here, the Num of Locations may be a number of the plurality of sensed locations measured by the single bending sensor 260. Depending on embodiments, a plurality of the bending sensors 260 may measure a plurality of the sensed locations. In this case, the Num of Locations may be a number of the plurality of sensed locations measured by the plurality of the bending sensors 260.

The Distance between Location may denote the distance between the adjacent sensed locations. A plurality of the bending sensors 260 may sense a plurality of the sensed locations.

The numOfAxes may denote dimension of the angle value measurable by the bending sensor 260.

The numOfSensors may denote segments measurable by a plurality of the bending sensors 260 when the plurality of sensed locations are measured by the plurality of the bending sensors 260.

Depending on embodiments, the sensor capability of the bending sensor 260 may further include accuracy and offset.

The accuracy may denote information on a measurement error.

The offset may denote a value for zero point adjustment of the angle value measured by the bending sensor 260.

Table 1 shows an extensible markup language (XML) syntax with respect to a bending sensor capability type according to example embodiments. The bending sensor capability type may denote information on basic sensor capability of the bending sensor 260.

TABLE 1

```
<!-- ################################################## -->
<!-- Bending Sensor capability type          -->
<!-- ################################################## -->
<complexType name="BendSensorCapabilityType">
    <complexContent>
        <extension base="cid:SensorCapabilityBaseType">
            <attribute name="numOfLocations" type="nonNegativeInteger" use="optional"/>
            <attribute name="distanceBtwnLocations" type="float" use="optional"/>
            <attribute name="numOfAxes" type="nonNegativeInteger" use="optional" default="1"/>
            <attribute name="numOfSensors" type="nonNegativeInteger" use="optional" default="1"/>
        </extension>
    </complexContent>
</complexType>
```

Table 2 shows semantics related to the bending sensor capability type according to example embodiments.

TABLE 2

| Name | Definition |
| --- | --- |
| BendingSensorCapabilityType | Tool for describing a bending sensor capability. |
| maxValue | Describes the maximum value that the bending sensor can perceive in terms of degree. |
| minValue | Describes the minimum value that the bending sensor can perceive in terms of degree. |
| numOfLocations | Describes the number of locations that a bending sensor can sense bending angles. |
| distanceBtwnLocations | Describes the distance between the adjacent sensing locations. |

TABLE 2-continued

| Name | Definition |
| --- | --- |
| numOfAxes | Describes the dimension that the bending sensor can perceive the bending angles. |
| numOfSensors | Describes the number of segments that an array of bending sensors can perceive. |

According to an aspect of the present disclosure, the sensor capability may include metadata encoded into a binary format. In details, the bending sensor 260 may generate the metadata by encoding the sensor capability into the binary format, and transmit the metadata to the virtual world processing apparatus 200. Here, the receiving unit 210 may receive the sensor capability that includes the metadata encoded into the binary format.

Table 2-2 shows binary representation syntax related to the bending sensor capability type, according to example embodiments.

TABLE 2-2

| BendingSensorCapabilityType{ | (Number of bits) | (Mnemonic) |
| --- | --- | --- |
| numOfLocationFlag | 1 | bslbf |
| distanceBtwnLocationFlag | 1 | bslbf |
| numOfAxisFlag, | 1 | bslbf |
| numOfSensorsFlag | 1 | bslbf |
| SensorCapabilityBase | | SensorCapabilityBaseType |
| if(numOfLocationFlag){ | | |
|    numOfLocation | 16 | uimsbf |
| } | | |
| if(distanceBtwnLocationFlag){ | | |
|    distanceBtwnLocation | 32 | fsbf |
| } | | |
| if(numOfAxesFlag){ | | |
|    numOfAxes | 2 | uimsbf |
| } | | |
| if(numOfSensorsFlag){ | | |
|    numOfSensors | 8 | uimsbf |
| } | | |
| } | | |

Table 2-3 shows semantics related to binary encoding of the bending sensor capability type, according to example embodiments.

TABLE 2-3

| Name | Definition |
| --- | --- |
| numOfLocationFlag | This field, which is only present in the binary representation, indicates the presence of the "numOfLocation" attribute. A value of "1" implies that the attribute shall be used and a value of "0" implies that the attribute shall not be used. |
| distanceBtwnLocationFlag | This field, which is only present in the binary representation, indicates the presence of the "distanceBtwnLocation" attribute. A value of "1" implies that the attribute shall be used and a value of "0" implies that the attribute shall not be used. |
| numOfAxesFlag | This field, which is only present in the binary representation, indicates the presence of the "numOfAxes" attribute. A value of "1" implies that the attribute shall be used and a value of "0" implies that the attribute shall not be used. |
| numOfSensorsFlag | This field, which is only present in the binary representation, indicates the presence of the "numOfSensors" attribute. A value of "1" implies that the attribute shall be used and a value of "0" implies that the attribute shall not be used. |
| NumOfLocations | Same as above. For the binary representation, the type of data is 16-bit unsigned integer. |

TABLE 2-3-continued

| Name | Definition |
|---|---|
| DistanceBtwnLocations | Same as above.<br>For the binary representation, the type of data is 32 bit floating value. |
| numOfAxes | Same as above.<br>For the binary representation, 2-bit data field is reserved to support up to 3 axes. |
| numOfSensors | Same as above.<br>For the binary representation, 8-bit data field is reserved to support an array of bend sensors. |

Referring to Table 2-3, the metadata encoded into the binary format may include a data field related to at least one attribute selected from the Num of Locations, the numOfAxes, and the numOfSensors, for example. That is, the sensor capability which is the metadata encoded into the binary format may limit data size by including the data field related to the at least one attribute selected from the Num of Locations, the numOfAxes, and the numOfSensors, for example.

Table 3 shows an example sensor capability of the bending sensor 260.

TABLE 3

```
cidl:SensorDeviceCapability xsi:type=
"scdv:BendingSensorCapabilityType" id="BS001" maxValue="90.0"
minValue="-30.0" numOfLevels="2500" offset="0.05" >
    <cidl:Accuracy xsi:type="cidl:ValueAccuracy" value="0. 1"/>
</cidl:SensorDeviceCapability>
```

Referring to Table 3, an identifier ID of the bending sensor 260 may be 'BS001.' The maxValue of the bending degree, that is, the angle, of the sensed location measurable by the bending sensor 260 may be '90.0 degree' while the minValue may be '−30.0 degree.' In addition, a number of levels (numOfLevels) may be '2500 level.' The accuracy of the bending sensor 260 may be '0.1 degree.' The offset of the bending sensor 260 may be '0.05 degree.'

Table 4 shows XML syntax with respect to a bending sensor type according to an example embodiment. The bending sensor type may denote information on the sensed information measured by the bending sensor 260.

TABLE 4

```
<!--###################################### -->
<!--Definition of Bending Sensor type   -->
<!--###################################### -->
<complexType name="BendingSensorType">
    <complexContent>
        <extension base="iidl:SensedInfoBaseType">
            <sequence>
                <element name="Value" type="float"
minOccurs="0" maxOccurs="unbounded"/>
            </sequence>
            <attribute name="unit" type="mpegvct:unitType"
                use="optional"/>
        </extension>
    </complexContent>
</complexType>
```

The bending sensor type according to example embodiments may include Timestamp, Unit, and Value.

The Timestamp denotes information on time when the bending sensor 260 measures the angle value of the sensed location. Depending on embodiments, the Timestamp may be information on an interval of time when the bending sensor 260 measures the angle value.

The Unit denotes a unit of the angle measured by the bending sensor 260. Depending on embodiments, the Unit may include 'degree.'

The Value denotes an angle value measured by the bending sensor 260. Depending on embodiments, when a plurality of the bending sensors 260 measure the angle value with respect to one sensed location, the angle value of the sensed location may be a sum total of a plurality of angle values measured by the plurality of bending sensors 260.

Hereinafter, an operation of measuring the angle value by the plurality of the bending sensors 260 will be described with reference to FIG. 3.

Figure 3:
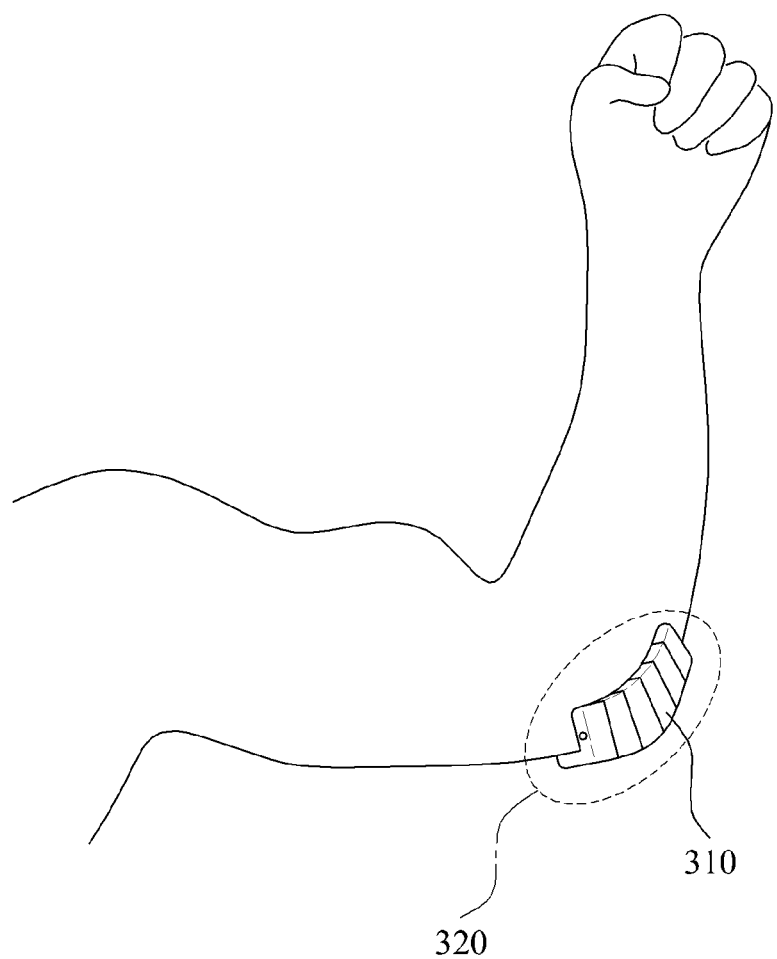
FIG. 3 is a diagram illustrating an operation of measuring a sensed location by a plurality of bending sensors, according to example embodiments.

FIG. 3 illustrates an operation of measuring a sensed location by a plurality of bending sensors 310, according to example embodiments.

Referring to FIG. 3, the plurality of the bending sensors 310 may measure a bending degree, that is, an angle, of a sensed location 320.

Here, a sum total of angle values measured by the plurality of the bending sensors 310 may represent the total angle value of the sensed location 320. For example, when ten bending sensors 310 measure the angle values of the sensed location 320, and the respective angle values measured by the bending sensors 310 are 1 degree, 3 degrees, 5 degrees, 10 degrees, 12 degrees, 12 degrees, 9 degrees, 5 degrees, 2 degrees, and 1 degree, the angle value of the sensed location 320 may be 60 which is the sum total of the respective angle values.

Referring back to FIG. 2, Table 4-2 shows semantics related to the bending sensor type according to the above example embodiment.

TABLE 4-2

| Name | Definition |
|---|---|
| BendingSensorType | Tool for describing sensed information with respect to a Bending sensor. |
| TimeStamp | Describes the time that the information is acquired (sensed). |
| unit | Specifies the unit of the sensed value, if a unit other than the default unit is used, as a reference to a classification scheme term provided by UnitTypeCS defined in A.2.1 of ISO/IEC 23005-6. If the unit is not defined here, the default unit is degree. |
| value | Describes the sensed value by the bending with respect to the default unit or the unit defined in the unit attribute. The values can be multiple if the bending sensor provides multiple angle values at multiple locations. |

Table 4-3 shows binary representation syntax related to the bending sensor type according to the above example embodiment.

TABLE 4-3

| BendSensorType{ | Number of bits | Mnemonic |
|---|---|---|
| unitFlag | 1 | bslbf |
| SensedInfoBaseType |  | SensedInfoBaseType |
| numOfSensors | 16 | uimsbf |
| numOfAxis | 2 | uimsbf |
| numOfLocations | 16 | uimsbf |
| for(i=0 ;k<numOfSamples ;i ++){ |  |  |
|   for(j = 0; j< numOfAxis; j++){ |  |  |
|     for(k=0;k< numOfLocations;k++){ |  |  |
|       ArrayValue[ (i-1)* numOfLocation* numOfAxis + (j-1)* NumOfLocations + k ] | 32 | fsbf |
|     } |  |  |
|   } |  |  |
| } |  |  |
| If (unitFlag == 1){ |  |  |
|   unit |  | unitType |
| } |  |  |
| } |  |  |

Table 4-4 shows semantics related to binary encoding of the bending sensor type according to the above example embodiment.

TABLE 4-4

| Name | Definition |
|---|---|
| numOfSensors | This field, which is only present in the binary representation, signals the number of bend sensors. |
| numOfAxis | This field, which is only present in the binary representation, signals the dimension of the data at the sensing locations. |
| numOfLocations | This field, which is only present in the binary representation, signals the number of sensing locations. |

Table 5 shows XML syntax with respect to a bending sensor type according to another example embodiment.

TABLE 5

```
<!--#####################################-->
<!--Definition of Bending Sensor type  -->
<!--#####################################-->
<complexType name="BendingSensorType">
    <complexContent>
        <extension base="iidl:SensedInfoBaseType">
            <sequence>
                <element name="ArrayBendingValue" type="mpeg7:FloatMatrixType" minOccurs="0" maxOccurs="unbounded"/>
                <element name="Value" type="float"/>
            </sequence>
            <attribute name="unit" type="mpegvct:unitType" use="optional"/>
        </extension>
    </complexContent>
</complexType>
```

Table 5-2 shows semantics related to the bending sensor type according to this example embodiment.

TABLE 5-2

| Name | Definition |
|---|---|
| BendingSensorType | Tool for describing sensed information with respect to a Bending sensor. |
| TimeStamp | Describes the time that the information is acquired (sensed). |

TABLE 5-2-continued

| Name | Definition |
|---|---|
| unit | Specifies the unit of the sensed value, if a unit other than the default unit is used, as a reference to a classification scheme term provided by UnitTypeCS defined in A.2.1 of ISO/IEC 23005-6. If the unit is not defined here, the default unit is degree. |
| ArrayBendingValue | Describes the sensed value by bending according to 3-axis with respect to the default unit or the unit defined in the unit attribute. Note: the ArrayValue defines by the number of locations and the number of axis. Ten by three matrix indicates that the arrayValue has 10 sensing locations, each of which has 3-axis bending angles. |
| value | Describes the sensed value by bending in scalar. This element shall be used, if the sensor is capable of sensing only a degree of bending. |

Table 6 shows XML syntax with respect to a bending sensor type according to yet another example embodiment.

TABLE 6

```
<!--#####################################-->
<!--Definition of Bending Sensor type  -->
<!--#####################################-->
<complexType name="BendingSensorType">
    <complexContent>
        <extension base="iidl:SensedInfoBaseType">
            <sequence>
                <element name="ArrayBendingValue" type="mpeg7:FloatMatrixType" minOccurs="1" maxOccurs="unbounded"/>
            </sequence>
            <attribute name="unit" type="mpegvct:unitType" use="optional"/>
        </extension>
    </complexContent>
</complexType>
```

Table 6-2 shows semantics related to the bending sensor type according to this example embodiment.

TABLE 6-2

| Name | Definition |
|---|---|
| BendingSensorType | Tool for describing sensed information with respect to a Bending sensor. |
| TimeStamp | Describes the time that the information is acquired (sensed). |
| unit | Specifies the unit of the sensed value, if a unit other than the default unit is used, as a reference to a classification scheme term provided by UnitTypeCS defined in A.2.1 of ISO/IEC 23005-6. If the unit is not defined here, the default unit is degree. |
| ArrayBendingValue | Describes the set of sensed values by the bending with respect to the default unit or the unit defined in the unit attribute on each joint. Note: the ArrayValue defines by the number of axes and the number of locations. Three by ten matrix indicates that the arrayValue has 10 sensing locations, each of which has 3-axis bending angles. The order of values in each row of the matrix may be started from the fingertip to the palm side. |

Table 7 shows binary representation syntax related to a bending sensor type according to example embodiments.

TABLE 7

| BendSensorType{ | Number of bits | Mnemonic |
|---|---|---|
| unitFlag | 1 | bslbf |
| SensedInfoBaseType | | SensedInfoBaseType |
| numOfSensors | 16 | uimsbf |
| numOfAxes | 2 | uimsbf |
| numOfLocations | 16 | uimsbf |
| for(i=0 ;k<numOfSensors ;i ++ ){ | | |
|   for(j = 0; j< numOfAxes; j++){ | | |
|     for(k=0;k< numOfLocation;k+ + ){ | | |
|       ArrayValue [ (i-1)* numOfLocation* numOfAxis + (j-1)* NumOfLocations + k ] | 32 | fsbf |
|     } | | |
|   } | | |
|   If (unitFlag == 1){ | | |
|     unit | | unitType |
|   } | | |
| } | | |

Table 7-2 shows semantics related to binary encoding of the bending sensor type according to example embodiments.

TABLE 7-2

| Name | Definition |
|---|---|
| numOfSensors | This field, which is only present in the binary representation, signals the number of bend sensors. |
| numOfAxes | This field, which is only present in the binary representation, signals the dimension of the data at the sensing locations. |
| numOfLocations | This field, which is only present in the binary representation, signals the number of sensing locations. |

Table 8 shows an example of sensed information measured by the bending sensor 260.

TABLE 8

```
<iidl:SensedInfo xsi:type="siv:BendingSensorType" id="bending01"
activate="true" sensorIdRef="bendingID01">
    <iidl:TimeStamp xsi:type="mpegvct:ClockTickTimeType"
timeScale="100" pts="60000"/>
</iidl:SensedInfo>
```

Referring to Table 8, an ID of the sensed information may be 'bending01' and an ID of the bending sensor 260 may be 'bendingID01.' That is, the sensed information measured by the bending sensor 260 of 'bendingID01' may be 'bending01.' In addition, a timestamp of the bending sensor 260 may be '60000' for 100 clock ticks per second.

The processing unit 220 may generate control information for controlling an object 280 of a virtual world 270 corresponding to the sensed location, based on the angle value and the sensor capability.

For example, when an angle of the elbow of the user 250 changes from 180 degrees to 90 degrees, the bending sensor 260 may measure the angle value and transmit the angle value to the virtual world processing apparatus 200. Here, based on the angle value and the sensor capability, the processing unit 220 may generate the control information for controlling the object 280 of the virtual world 270, for example an avatar, which corresponds to the sensed location, that is, the elbow, to also move the elbow.

According to an aspect, the processing unit 220 may generate the control information when the angle value measured by the bending sensor 260 is within a range, i.e., less than or equal to the maximum value measurable by the bending sensor 260 and greater than or equal to the minimum value measurable by the bending sensor 260.

Depending on embodiments, when the angle value is greater than the maximum value, the processing unit 220 may generate the control information considering the angle value as the maximum value. When the angle value is less than the minimum value, the processing unit 220 may generate the control information considering the angle value as the minimum value.

The transmission unit 230 may transmit the generated control information to the virtual world 270.

Depending on embodiments, the transmission unit 230 may encode the control information into metadata of an XML format and transmit the metadata to the virtual world 270. In addition, the transmission unit 230 may encode the control information into binary metadata and transmit the binary metadata to the virtual world 270. Also, the transmission unit 230 may encode the control information into first metadata of the XML format, encode the first metadata into second metadata of a binary format, and transmit the second metadata to the virtual world 270.

The virtual world processing apparatus 200 may further include a calculation unit 240.

The calculation unit 240 may calculate a third angle value related to a third sensed location disposed between a first sensed location and a second sensed location, based on a first angle value related to the first sensed location and a second angle value related to the second sensed location.

Here, the processing unit 220 may generate the control information based on the first angle value, the second angle value, the third angle value, and the sensor capability.

Hereinafter, an operation of calculating the third angle value will be described in detail with reference to FIG. 4.

Figure 4:
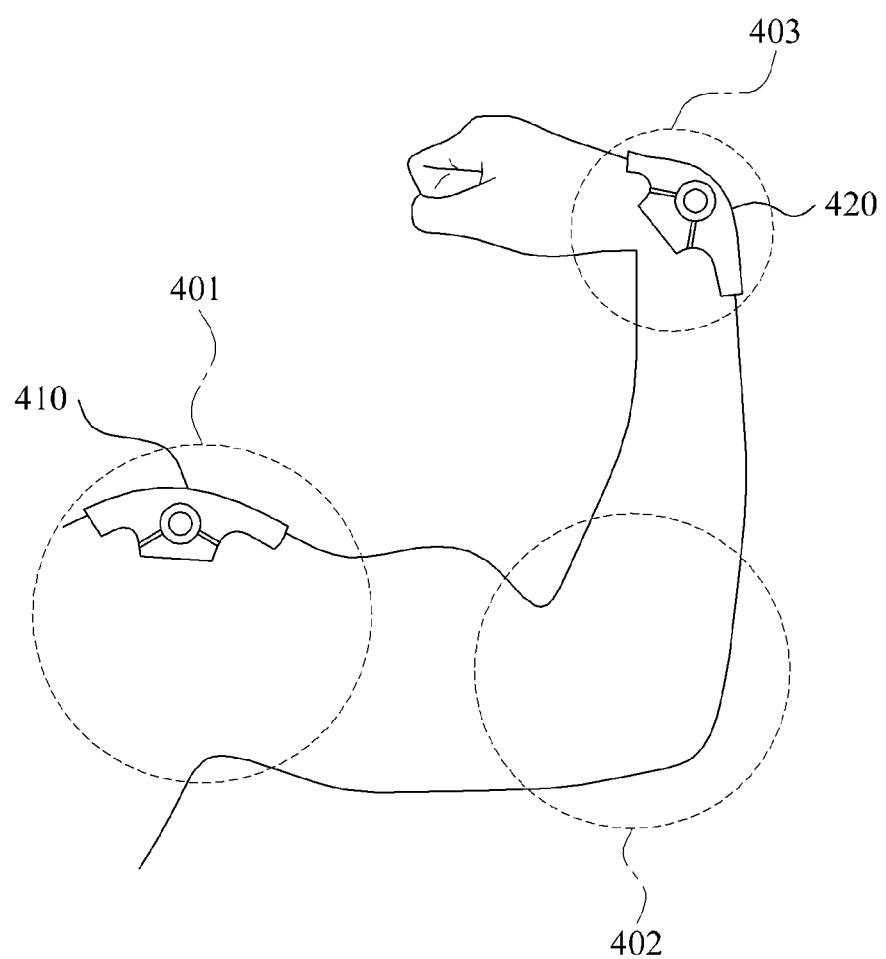
FIG. 4 is a diagram illustrating an operation of calculating an angle value by a virtual world processing apparatus, according to example embodiments.

FIG. 4 illustrates an operation of calculating an angle value by a virtual world processing apparatus according to example embodiments.

Referring to FIG. 4, a bending sensor 410 according to the example embodiments may measure a first angle value related to a first sensed location 401, for example, a shoulder. Another bending sensor 420 may measure a second angle value related to a second sensed location 403, for example, a wrist.

The virtual world processing apparatus may calculate the third angle value of a third sensed location 402 not sensed by the bending sensors 410 and 420, based on the first angle value and the second angle value. That is, the number of sensors needed may be reduced as the third angle is calculated using the sensed first angle value and the second angle value.

Depending on embodiments, the virtual world processing apparatus 200 may set an average of the first angle value and the second angle value as the third angle value.

Depending on embodiments, the virtual world processing apparatus may further include a database collecting and storing the third angle value based on the first angle value and the second angle value. The virtual world processing apparatus may calculate the third angle value based on information stored in the database, the first angle value, and the second angle value.

Figure 5:
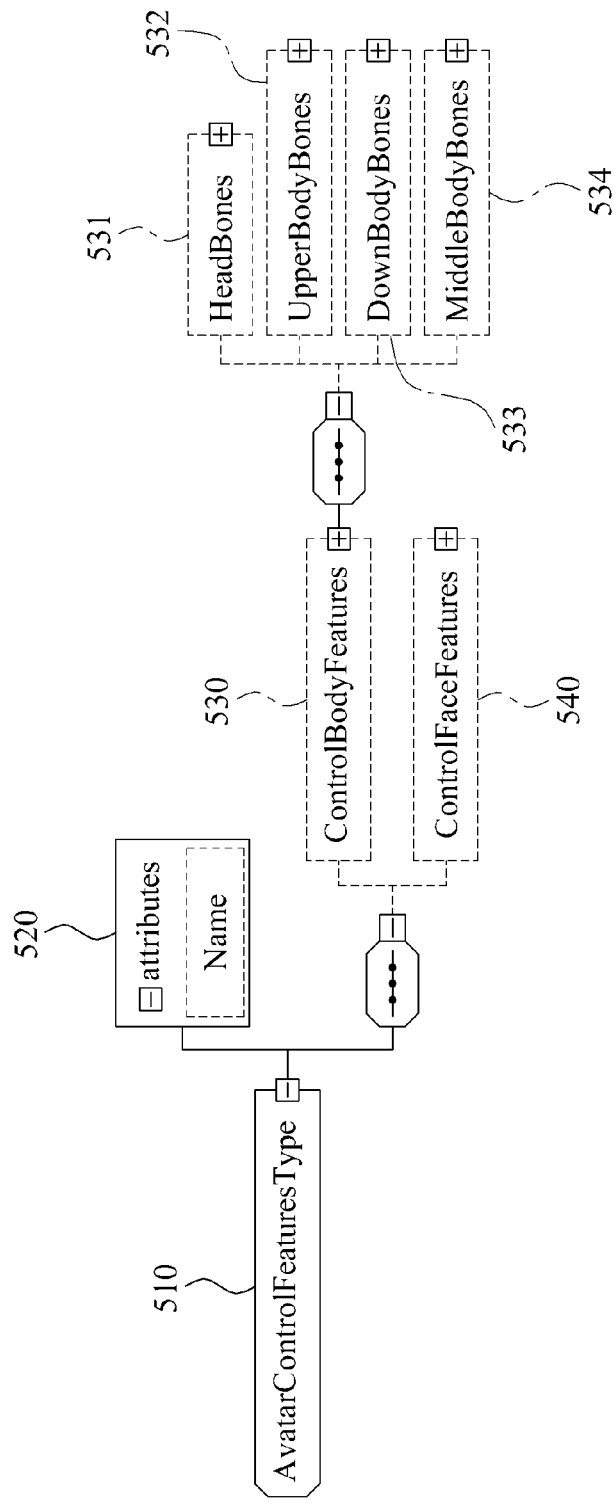
FIG. 5 is a diagram illustrating a structure of an avatar control features type, according to example embodiments.

FIG. 5 illustrates a structure of an avatar control features type 510 according to example embodiments.

Referring to FIG. 5, the avatar control features type 510 may include attributes 520, control body features 530, and control face features 540, for example.

The avatar control features information denotes information on features of an avatar, used for control of the avatar of a virtual world. Here, the avatar control features type 510 denotes information on a type of the avatar control features type 510.

The attributes 520 denotes information on attributes of the avatar control features information. Depending on embodiments, the attributes 520 may include name information of the features, used for control of the avatar.

The control body features 530 denote features included in a body part of the avatar, used for control of the avatar.

Depending on embodiments, the control body features 530 may include HeadBones 531, UpperBodyBones 532, DownBodyBones 533, and MiddleBodyBones 534.

For example, the UpperBodyBones 532 may include information on features corresponding to a hand structure of the avatar.

The hand structure may include a sub structure such as a wrist, finger joints, and the like.

Table 9 shows the sub structure of the hand structure according to example embodiments.

TABLE 9

| | |
|---|---|
| LWrist | Left wrist |
| LHand | Left hand |
| LThumb | Thumb proximal phalange |
| LPhalanges1 | Thumb proximal phalange |
| LThumb2 | Thumb distal phalange |
| LPhalanges2 | Thumb distal phalange |
| LIndex | Index finger metacarpal |
| LPhalanges3 | Index finger proximal phalange |
| LPhalanges4 | Index finger middle phalange |
| LPhalanges5 | Index finger distal phalange |
| LMiddle | Middle finger metacarpal |
| LPhalanges6 | Middle finger proximal phalange |
| LPhalanges7 | Middle finger middle phalange |
| LPhalanges8 | Middle finger distal phalange |
| LRing | Ring finger metacarpal |
| LPhalanges9 | Ring finger proximal phalange |
| LPhalanges10 | Ring finger middle phalange |
| LPhalanges11 | Ring finger distal phalange |
| LPinky | Pinky metacarpal |
| LPhalanges12 | Pinky proximal phalange |
| LPhalanges13 | Pinky middle phalange |
| LPhalanges14 | Pinky distal phalange |

According to an aspect, the virtual world processing apparatus may generate control information for controlling the avatar control features corresponding to sensed locations, based on sensed information measured by a bending sensor. That is, the sensed locations measured by the bending sensor may correspond to at least one of the avatar control features.

For example, when the bending sensor measures a bending degree of a wrist of a user, the virtual world processing apparatus may generate the control information for controlling a movement of a wrist of the avatar of the virtual world, which corresponds to the wrist of the user.

Figure 6:
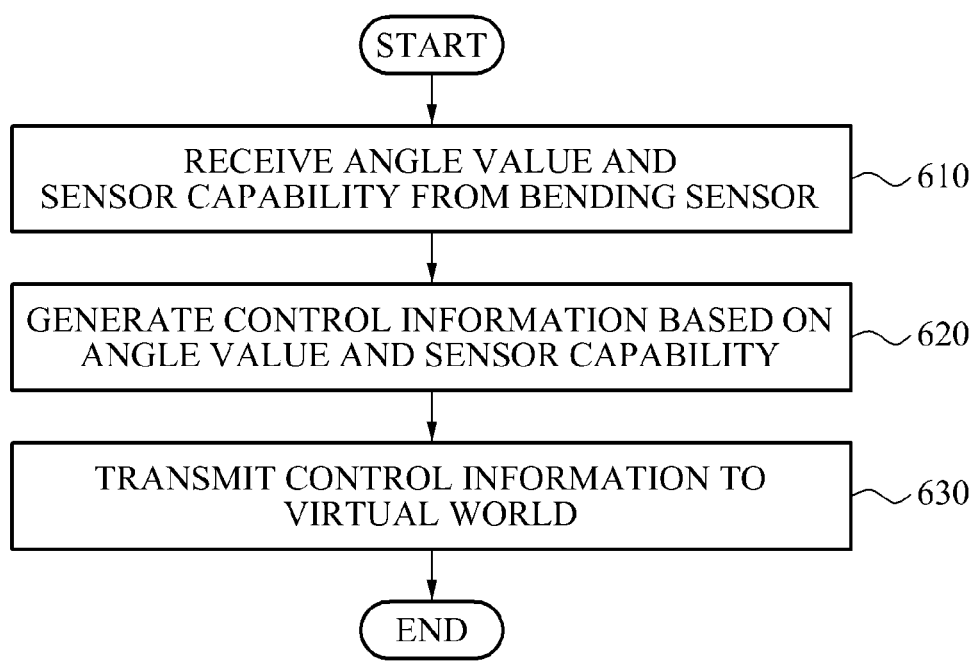
FIG. 6 is a flowchart illustrating a virtual world processing method, according to example embodiments.

FIG. 6 illustrates a virtual world processing method according to example embodiments.

Referring to FIG. 6, the virtual world processing method may receive an angle value of a sensed location and sensor capability of a bending sensor, from the bending sensor, in operation 610.

The bending sensor may measure sensed information on a bending degree of an object in a real world. The sensed information denotes a measured value of the bending degree, that is, an angle of the sensed location measured by the bending sensor.

Depending on embodiments, the bending sensor may be attached or connected to the sensed location to measure the bending degree, that is, the angle of the sensed location. For example, when a user attaches the bending sensor to an elbow, the bending sensor may sense a bending degree of the elbow, that is, an angle of the elbow. At this time, the virtual world processing method may receive the angle value of the elbow and the sensor capability of the bending sensor, from the bending sensor.

The bending sensor may be connected to other joints of the user, including elbows, finger joints, a neck, shoulders, and the like, to measure bending degrees of the joints. That is, bending sensors may be placed at various joints of the user and simultaneously sense bending degrees of the various joints.

The sensor capability denotes the capability of the bending sensor.

According to example embodiments, the sensor capability of the bending sensor may include at least any combination of maxValue, minValue, Num of Locations, Distance between Location, numOfAxes, and numOfSensors.

The maxValue may denote a maximum angle value measurable by the bending sensor. The minValue may denote a minimum angle value measurable by the bending sensor. The bending sensor may measure an angle of the sensed location within a range from greater than the minValue to smaller than the maxValue.

The Num of Locations may denote the number of the sensed locations sensed by the bending sensor. According to an aspect, the bending sensor may singly and simultaneously sense bending degrees of a plurality of sensed locations. Here, the Num of Locations may be a number of the plurality of sensed locations measured by the single bending sensor. Depending on embodiments, a plurality of the bending sensors may measure a plurality of the sensed locations. In this case, the Num of Locations may be a number of the plurality of sensed locations measured by the plurality of the bending sensors.

The Distance between Location may denote the distance between the adjacent sensed locations. A plurality of the bending sensors may sense a plurality of the sensed locations.

The numOfAxes may denote dimension of the angle value measurable by the bending sensor.

The numOfSensors may denote segments measurable by a plurality of the bending sensors when the plurality of sensed locations are measured by the plurality of the bending sensors.

Depending on embodiments, the sensor capability of the bending sensor may further include accuracy and offset.

The accuracy may denote information on a measurement error.

The offset may denote a value for zero point adjustment of the angle value measured by the bending sensor.

According to an aspect, the sensor capability may include metadata encoded into a binary format. The metadata encoded into the binary format may include a data field related to at least one attribute selected from the Num of Locations, the numOfAxes, and the numOfSensors. That is, the sensor capability which is the metadata encoded into the binary format may limit data size by including the data field related to the at least one attribute selected from the Num of Locations, the numOfAxes, and the numOfSensors.

The bending sensor type may denote information on the sensed information measured by the bending sensor.

According to example embodiments, the bending sensor type may include Timestamp, Unit, and Value.

The Timestamp denotes information on time when the bending sensor measures the angle value of the sensed location. Depending on embodiments, the Timestamp may be information on an interval of time when the bending sensor measures the angle value.

The Unit denotes a unit of the angle measured by the bending sensor. Depending on embodiments, the Unit may include 'degree.'

The Value denotes an angle value measured by the bending sensor. Depending on embodiments, when a plurality of the bending sensors measure the angle value with respect to one sensed location, the angle value of the sensed location may be a sum total of a plurality of angle values measured by the plurality of bending sensors.

In operation 620, the virtual world processing method may generate control information for controlling an object of a virtual world corresponding to the sensed location, based on the angle value and the sensor capability received from the bending sensor.

For example, when an angle of the elbow of the user changes from 180 degrees to 90 degrees, the bending sensor may measure the angle value. Here, based on the angle value and the sensor capability, the virtual world processing method may generate the control information for controlling the object of the virtual world, for example an avatar 280. That is, using the virtual world processing method, changing an angle of the user's elbow may also move the corresponding location of the avatar, i.e., the elbow of an avatar 280.

According to an aspect, the virtual world processing method may generate the control information when the angle value measured by the bending sensor is within a range, i.e., less than or equal to the maximum value measurable by the bending sensor and greater than or equal to the minimum value measurable by the bending sensor.

Depending on embodiments, when the angle value is greater than the maximum value, the virtual world processing method may generate the control information considering the angle value as the maximum value. When the angle value is less than the minimum value, the virtual world processing method may generate the control information considering the angle value as the minimum value.

In operation 630, the virtual world processing method may transmit the generated control information to the virtual world.

Depending on embodiments, the virtual world processing method may encode the control information into metadata of an XML format and transmit the metadata to the virtual world. In addition, the virtual world processing method may encode the control information into binary metadata and transmit the binary metadata to the virtual world. Also, the virtual world processing method may encode the control information into first metadata of the XML format, encode the first metadata into second metadata of a binary format, and transmit the second metadata to the virtual world.

The virtual world processing method may calculate a third angle value related to a third sensed location disposed between a first sensed location and a second sensed location, based on a first angle value related to the first sensed location and a second angle value related to the second sensed location.

The methods according to the above-described example embodiments may be recorded in non-transitory computer-readable media including program instructions to implement various operations embodied by a computer. The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Further, according to an aspect of the embodiments, any combinations of the described features, functions and/or operations can be provided.

Moreover, the virtual world processing apparatus discussed above may include at least one processor to execute at least one of the above-described units and methods.

Although example embodiments have been shown and described, it would be appreciated by those skilled in the art that changes may be made in these example embodiments without departing from the principles and spirit of the present disclosure, the scope of which is defined in the claims and their equivalents.

The invention claimed is:

1. A virtual world processing apparatus comprising:
   a receiver configured to:
      receive an angle value, sensed by a bending sensor, of at least one sensed location of the bending sensor, and
      receive sensor capability information of the bending sensor;
   a processor configured to generate control information for controlling an object of a virtual world corresponding to the at least one sensed location, based on the received angle value and the sensor capability information; and
   a transmitter configured to transmit the control information to the virtual world;
   a calculator configured to calculate a third angle value related to a third location, not sensed by a bending sensor, disposed between a first sensed location and a second sensed location, based on a first angle value related to the first sensed location, sensed by a first bending sensor, and a second angle value related to the second sensed location, sensed by a second bending sensor, wherein the processor is configured to generate the control information based on the first angle value, the second angle value, the third angle value, and the sensor capability information, and wherein the sensor capability information comprises at least one of:
a number of sensed locations of the bending sensor, or
a distance between the sensed locations.

2. The virtual world processing apparatus of claim 1, wherein the sensor capability information further comprises a maximum value and a minimum value of the angle value measurable by the bending sensor.

3. The virtual world processing apparatus of claim 2, wherein the processor generates the control information when the angle value is less than or equal to the maximum value and is greater than or equal to the minimum value.

4. The virtual world processing apparatus of claim 2, wherein the sensor capability information further comprises an accuracy and an offset.

5. The virtual world processing apparatus of claim 1, wherein the at least one sensed location of the bending sensor comprises the first sensed location and the second sensed location, and wherein the sensor capability information comprises the distance between the first sensed location and the second sensed location.

6. The virtual world processing apparatus of claim 1, wherein the received angle value is a sum total of a plurality of angle values measured by a plurality of bending sensors when the plurality of the bending sensors measures the plurality of angle values with respect to the at least one sensed location.

7. The virtual world processing apparatus of claim 6, wherein the plurality of bending sensors simultaneously measures the at least one sensed location.

8. The virtual world processing apparatus of claim 1, wherein the sensor capability information further comprises metadata encoded into a binary format.

9. The virtual world processing apparatus of claim 8, wherein the metadata encoded into the binary format comprises a data field related to at least one attribute selected from a group consisting of: the number of sensed locations, a number of axes, and a number of sensors.

10. The virtual world processing apparatus of claim 8, wherein the bending sensor is configured to generate the metadata by encoding the sensor capability information into the binary format.

11. The virtual world processing apparatus of claim 1, wherein the third angle value is calculated as an average of the first angle value and the second angle value.

12. The virtual world processing apparatus of claim 1, wherein:
the sensor capability information is generated based on a binary representation syntax;
the binary representation syntax defines attributes related to the number of sensed locations, the distance between the sensed locations, and a number of axes, and flags corresponding to the attributes; and
the sensor capability information comprises the flags and at least one attribute corresponding to at least one flag having a predetermined logic value.

13. The virtual world processing apparatus of claim 1, wherein the sensor capability information comprises:
the number of sensed locations that describes the number of locations that the bending sensor can sense bending angles;
the distance between the sensed locations that describes the distance between adjacent sensing locations; and
a number of axes that describes a dimension that the bending sensor can perceive the bending angles.

14. A virtual world processing method, comprising:
receiving an angle value, sensed by a bending sensor, of at least one sensed location of the bending sensor;
receiving sensor capability information of the bending sensor;
generating control information for controlling an object of a virtual world corresponding to the at least one sensed location, based on the received angle value and the sensor capability information;
calculating a third angle value related to a third location, not sensed by a bending sensor and disposed between a first sensed location and a second sensed location, based on a first angle value, related to the first sensed location, sensed by a first bending sensor and a second angle value, related to the second sensed location, sensed by a second bending sensor,
wherein the generating control information comprises generating the control information based on the first angle value, the second angle value, the third angle value, and the sensor capability information; and
transmitting the control information to the virtual world,
wherein the sensor capability information comprises at least one of:
a number of sensed locations of the bending sensor, or
a distance between the sensed locations.

15. The virtual world processing method of claim 14, wherein the angle value is a sum total of a plurality of angle values measured by a plurality of bending sensors when the plurality of the bending sensors measures the plurality of angle values with respect to the at least one sensed location.

16. A non-transitory computer readable medium storing instructions that, when executed by a processor, cause the processor to perform the method of claim 14.

17. A method of interacting between a real world and a virtual world, the method comprising:
sensing angle values, by bending sensors disposed at sensed locations of a user;
receiving sensor capability information;
calculating a third angle value, associated with a third sensing location between a first sensing location and a second sensing location, based on a first angle value sensed by a first bending sensor at the first sensing location and a second angle value sensed by a second bending sensor at the second sensing location; and
generating control information for controlling an avatar of a virtual world corresponding to the sensed locations, based on the sensed angle values and the sensor capability information,
wherein the sensor capability information comprises at least one of:
a number of sensed locations of the bending sensors,
a distance between the sensed locations.

18. The method of claim 17, wherein the sensor capability information comprises information related to a capability of a bending sensor of the bending sensors.

19. The method of claim 18, wherein the sensor capability information further comprises
a maximum measurable angle value,
a minimum measurable angle value,
the number of the sensed locations, and
the distance between the sensed locations.

* * * * *